United States Patent [19]

Denk

[11] Patent Number: 4,633,898
[45] Date of Patent: Jan. 6, 1987

[54] SLIDE VALVE WITH PARTIAL-VACUUM ACTUATOR

[75] Inventor: Walter Denk, Ditzingen, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 780,441

[22] Filed: Sep. 26, 1985

[30] Foreign Application Priority Data

Oct. 11, 1984 [DE] Fed. Rep. of Germany ....... 8429994

[51] Int. Cl.$^4$ .............................................. F16K 41/00
[52] U.S. Cl. .................... 137/315; 251/61.5; 251/214; 277/137
[58] Field of Search ................. 137/315; 251/61, 61.5, 251/214, 63.5; 92/99, 128; 277/4, 101, 136, 137

[56] References Cited

U.S. PATENT DOCUMENTS

| | | | |
|---|---|---|---|
| 940,163 | 11/1909 | Kiel | 251/217 |
| 968,039 | 8/1910 | Farley | 251/214 |
| 1,171,695 | 2/1916 | Brady | 251/61.5 |
| 1,541,216 | 6/1925 | Hendricks | 251/367 X |
| 3,699,998 | 10/1972 | Baranowski, Jr. | 137/315 X |
| 3,933,339 | 1/1976 | Dietzsch | 251/176 |
| 4,529,330 | 7/1985 | Boski | 92/128 X |

Primary Examiner—Martin P. Schwadron
Assistant Examiner—Stephen M. Hepperle
Attorney, Agent, or Firm—Schwartz, Jeffery, Schwaab, Mack, Blumenthal & Evans

[57] ABSTRACT

A slide valve with a partial-vacuum actuator, especially for motor vehicle heating and air conditioning units, comprising a valve housing having a bottom; a slide for opening and closing the valve; a slide chamber for slidably containing the slide; an actuating rod connected with the slide, and for actuating the slide; a partial-vacuum actuator for actuating the actuating rod, and having a first housing section integral with the valve housing; a flat seal for sealing the sliding chamber, and for surrounding and sealing the actuating rod; a support for holding the flat seal against the bottom of the valve housing; and a bayonet mount with detent mechanism for fastening and securing the support inside the first housing section.

8 Claims, 3 Drawing Figures

SLIDE VALVE WITH PARTIAL-VACUUM ACTUATOR

BACKGROUND OF THE INVENTION

The invention pertains to a slide valve with a partial-vacuum actuator, especially for motor vehicle heating and/or air conditioning units.

A slide valve, having an actuator mounting flange to the side of the slide chamber opening, is known from German Offenlegungsschrift No. 22 55 278. A partial vacuum activating device, known from German Gebrauchsmuster No. 77 16 040, is often used as the actuator. This Gebrauchsmuster shows bore holes for mounting screws provided in one housing section. An actuator of the above type is thus mounted on the flange of the slide valve by means of mounting screws. In this assembly, separate mounting parts and additional assembly procedures, with corresponding costs, are thus required. Besides this, a reliable seating for the seal is not provided.

SUMMARY OF THE INVENTION

It is therefore the object of the invention to provide an improved slide valve with a partial-vacuum actuator of the type indicated above, such that manufacturing costs are reduced, a reliable seal between the slide valve and the partial-vacuum actuator is ensured, the number of separate parts reduced, and the assembly simplified.

This object is attained by a slide valve with a partial-vacuum actuator according to the invention. According to the invention, there has been provided a slide valve with a partial-vacuum actuator, especially for motor vehicle heating and air conditioning units, comprising a valve housing having a bottom; a slide for opening and closing said valve; a slide chamber for slidably containing the slide; an acutating rod connected with the slide, and for actuating the slide; a partial-vacuum actuator for actuating the actuating rod, and having a first housing section integral with the valve housing; a flat seal for sealing the sliding chamber, and for surrounding and sealing the actuating rod; a support for holding the flat seal against the bottom of the valve housing; and means for fastening and securing the support inside the first housing section.

Preferably, the slide valve with partial vacuum actuator further comprises a second housing section; a diaphragm stretched between the first and second housing sections for defining a space for creating a partial vacuum, and connected to the actuating rod; a return spring for biasing the actuating rod into a first position; a first circumferential ridge having a first diameter, for engaging the flat seal and disposed on the support; a second circumferential ridge having a second diameter, for engaging the flat seal and disposed on the bottom of the valve housing; wherein the second diameter is different from the first diameter.

In a preferred embodiment, the means for fastening and securing comprises a bayonent mount including a plurality of radial tabs on the support, a plurality of axial slots for slidably containing the tabs, and a plurality of circumferential slots verging into the axial slots, also for slidably containing the tabs.

Preferably, the tabs comprise a first pair of diametrically opposite tabs having a first width, and second pair of diametrically opposite tabs having a second width different from the first width; wherein the axial slots comprise a first pair of slots having substantially the first width and for engaging the first tabs, and a second pair of slots having substantially the second width and for engaging the second tabs.

Also preferably, the means for fastening and securing further comprises a detent mechanism including a first arrangement of ratchet teeth disposed between successive tabs on the support, a second ratchet member flexibly attached to the first housing section and for engaging the first arrangement.

The second ratchet member may comprise a spring tongue attached to said first housing section, and carrying two inwardly-directed ratchet teeth. A second arrangement of ratchet teeth diametrically opposite to the first arrangement and offset by half the width of a ratchet tooth may also be provided.

Further objects, features and advantages of the present application will become apparent from the detailed description of preferred embodiments which follows, when considered together with the attached figures of drawing.

DETAILED DESCRIPTION OF THE PREFERRED EMBODIMENTS

The essential advantages of the present invention are that the arrangement consists of few separate parts which can be assembled easily, and that the valve can be reliably sealed off from the environment by pressing the flat seal between a support and the bottom, so that no water can leak out.

According to a preferred embodiment of the invention, the surface of the support lying against the flat seal has at least one first circumferential ridge. A second ridge, facing in the opposite direction, is provided on the bottom of the housing section. The opposing ridges, on the bottom and the support, are disposed on different radii. This arrangement makes it possible, once the support is mounted, for the ridges to dig into flat seal material and thus to further enhance the reliability of the seal.

The bayonet mount comprises radial tabs on the support, and slots running axially and around the circumference of the housing section. In order to ensure that the support is pressed against the seal or the bottom when the support turns in the housing section, the circumferential slots are provided with circumferential guideways in the form of inclined planes sloping upward or helical sections.

An advantageous embodiment of the bayonent mount comprises four tabs disposed on the support and four matching slots disposed on housing section. The tabs are of different widths, and, in each case, the diametrically opposite tabs are of the same width and each of the axial slots matches the width of the tabs. This arrangement achieves the result that the support can be mounted in one way only; once mounted, the support is in a predetermined position. This is especially advantageous when a detent device preventing unintentional loosening of the support is provided. It is practical to embody the detent device in such a way that it includes an arrangement of several ratchet teeth between two successive tabs on the support. At least one ratchet tooth, held flexibly against the housing section, interacts with the ratchet teeth on the support. This ratchet tooth on the housing can easily be made flexible by means of spring tongues. To achieve the smallest possible ratchet tooth spacing, it is advantageous that two opposing identical arrangements of ratchet teeth be provided. One arrangement should be disposed on the support, and one on the housing section. The ratchet teeth on the ratchet tooth arrangement on the support should be offset with regard to the ratchet teeth on the housing section by half the width of a ratchet tooth.

Figure 1:
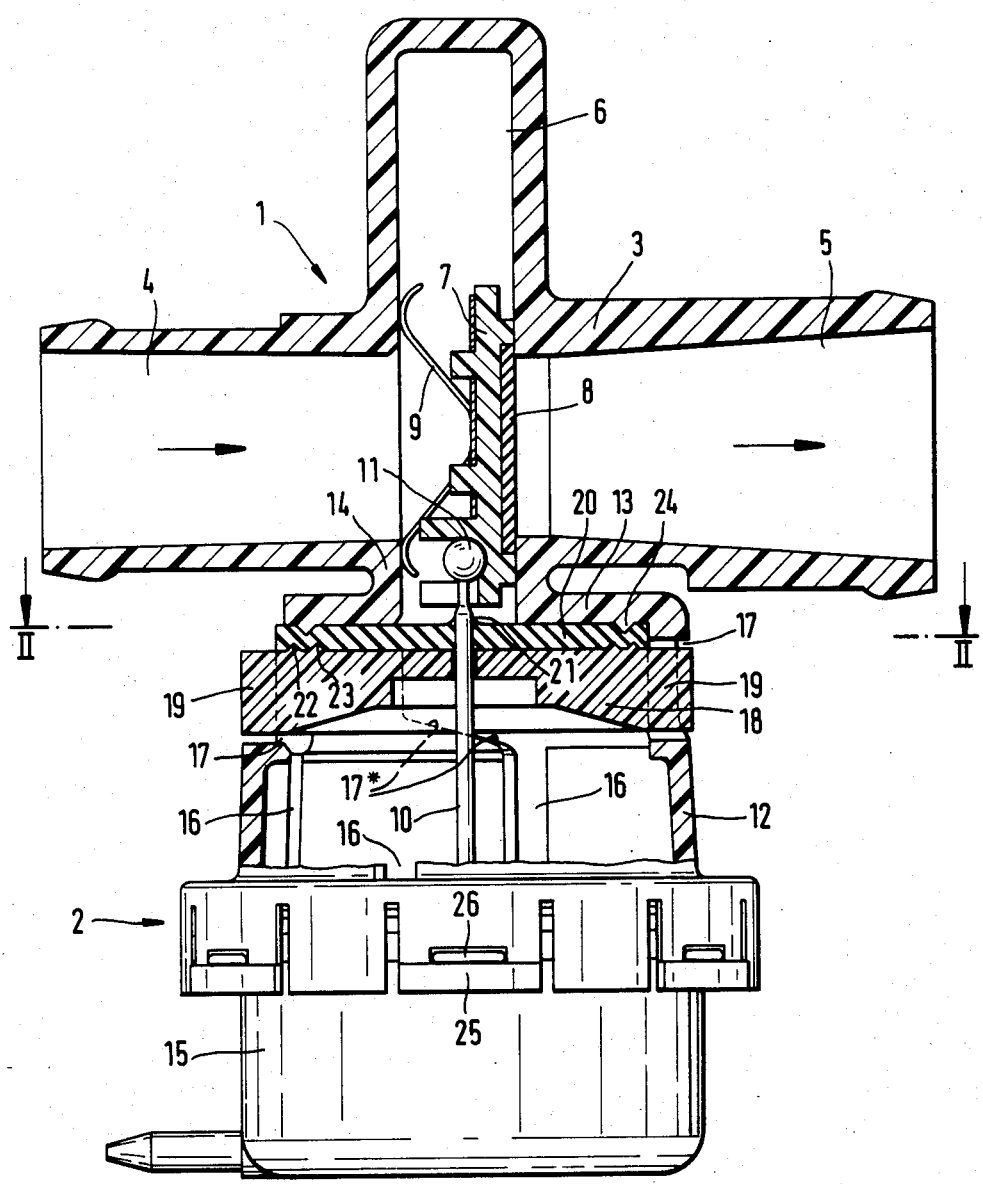
FIG. 1 shows a section through a slide valve with a partial-vacuum actuator

FIG. 1 shows a slide valve 1 with partial-vacuum actuator 2. An entire cross section of the slide valve, and a partial cross-section of the partial-vacuum actuator is also shown. A slide chamber 6 is disposed perpendicular to the direction of flow through a valve housing 3 having an intake 4 and an outlet 5.

A slide plate 7 having a seal 8, which in the representation shown covers the outlet 5, is located in the slide chamber 6. The slide plate 7 is pressed against the sealing surface surrounding the outlet 5 by a spring 9. The end of an actuating rod 10, embodied as a ball crown 11, is attached to the slide plate 7. The actuating rod is operated by the partial-vacuum actuator 2 and moves the slide plate 7.

One housing section 12 of the partial-vacuum actuator 2 is formed as one piece with the valve housing 3, such that the bottom 13 of the valve housing 12 becomes a neck 14 that forms the open end of the slide chamber 6. The partial-vacuum actuator 2 also includes a further housing section 15 and a diaphragm, not shown in the drawing, whose outside edge is stretched between the circumferential edges of the two housing sections 12 and 15. The diaphragm is loaded with a return spring, also not shown, in the direction of opening of the slide valve 1.

Housing section 12 has several axial slots 16 in its approximately cylindrical wall. The slots 16 extend starting from the edge which receives the other housing section 15 toward the bottom 13. Slots 16 merge into circumferential slits 17 located in the wall of housing section 12 near the bottom 13. A support 18 is inserted in housing section 12. The support 18 has a central opening through which the actuating rod 10 extends. The circumferential surface of the support has four outwardly-directed radial tabs 19. The tabs 19 mesh with the slits 17 of housing section 12. A flat seal 20 is pressed between the support 18 and the bottom 13 of housing section 12. The seal 20 is provided with a central opening to allow passage of the actuating rod 10. A sealing lip 21 serves to surround and seal the actuating rod 10. The flat seal 20 thus completely seals off the neck 14 region of slide chamber 6. There are two circumferential ridges, 22 and 23, on the side of support 18 facing the flat seal 20. When the support 18 is mounted, these ridges dig into the material of the flat seal 20. A circumferential ridge 24 is likewise disposed on the bottom 13 of housing section 12, whose radius is between that of ridges 22 and 23 and which is likewise pressed into the flat seal 20.

The slide valve 1 is assembled to the partial-vacuum actuator 2 so that the ball crown 11 of the actuating rod 10 is first encased in a support on the slide plate 7 provided for this purpose. At this stage, the slide plate 7 has already been supplied with the seal 8 and spring 9. The flat seal 20 and then the support 18 are then pushed onto the actuating rod 10. This preassembled unit, is then inserted—side plate 7 first—into housing section 12 and slide chamber 6. The tabs 19 on the support 18 are guided into the axial slots 16 in housing section 12 in the process, until they are located in the region of the circumferential slots 17. The support 18 is turned, causing the tabs 19 to slide along the inclined guideway 17*, pressing the support 18 increasingly against the flat seal 20 and the seal 20 against the bottom 13. The other end of the actuating rod 10 is fastened to a diaphragm disk onto which the diaphragm is stretched. Finally, the return spring is inserted between the diaphragm disk and the second housing section 15. The housing section 15 is then pressed against housing section 12 until the ridges 25 engage behind the corresponding pawls 26 in housing section 12 and the circumferential edges of housing sections 12 and 15 stretch the outside edge of the diaphragm between them.

Figure 2:
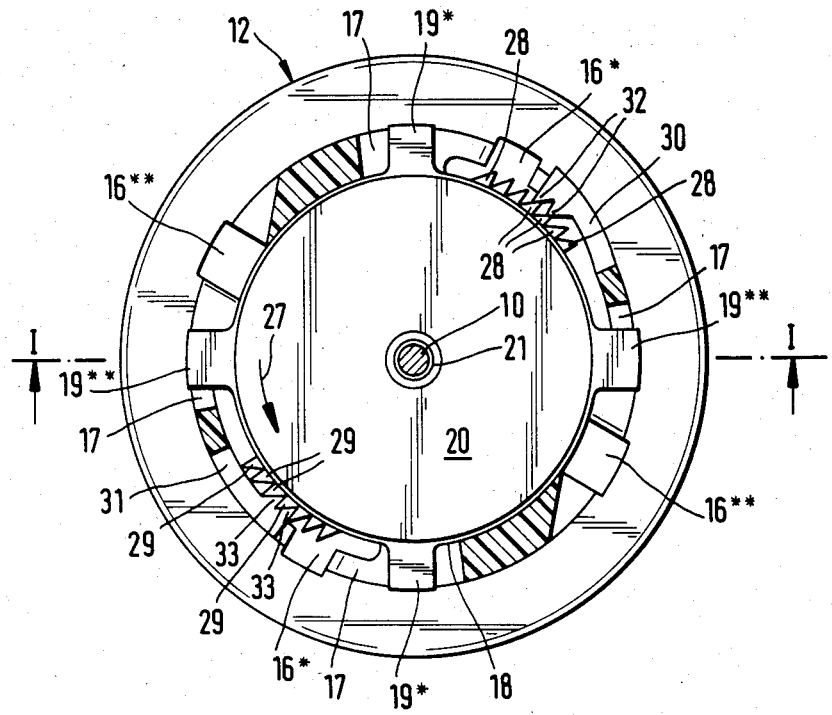
FIG. 2 shows a section along line II—II in FIG. 1.

FIG. 2 shows a section along line II—II in FIG. 1. The parts in FIG. 2 which have already been mentioned in FIG. 1 have the same reference numbers. This representation shows housing section 12 with the flat seal 20 and support 18 located within it. The middle of the flat seal 20 has the opening for the actuating rod 10 to pass through and a sealing lip 21 which rests against the actuating rod 10. The support 18 has four tabs, such that each pair of diametrically opposed tabs 19* are slightly narrower than tabs 19**, 90° around from them. The axial slots 16* and 16** have corresponding widths, so that the support 18 can only be mounted in correct position with regard to the ratchet teeth 28, 29 when tabs 19*, 19** come to rest in slots 16*, 16** provided for them, respectively. The support 18 is fastened in place by turning it in the direction of the arrow 27 so that the tabs 19* and 19** slide along the guideways formed by the circumferential slots 17.

FIG. 2 further shows that arrangements of several ratchet teeth 28 and 29 are located in two places on the circumference of support 18. Two spring tongues 30 and 31 are disposed on housing section 12 at the same level as the slots 17. The free end of each of these tongues has two ratchet teeth 32 and 33, directed radially inward. The ratchet teeth 28 and 29 on the support 18 are arranged in such a way that the ratchet teeth 28 are offset 180° plus half the width of a ratchet tooth 28 with regard to the ratchet teeth 29. This further ensures that either ratchet teeth 32 or ratchet teeth 33 will engage after half the width of a ratchet tooth in either case, thus making the ratcheting increments smaller. This can also be seen in FIG. 2, in which the ratchet teeth 33 on spring tongue 31 completely enter the notches between the ratchet teeth 29, while ratchet teeth 32 on spring tongue 30 are somewhat raised on the profile of ratchet teeth 28.

Figure 3:
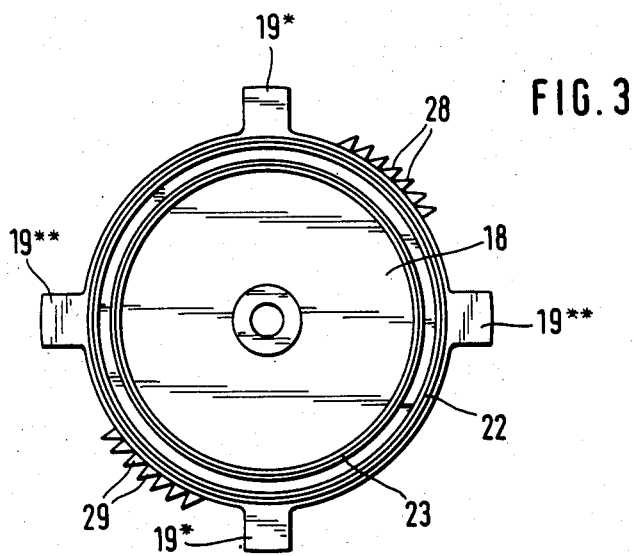
FIG. 3 shows a support as a separate part.

FIG. 3 shows the support 18 as a separate entity, in which the smaller tabs 19* are located along the vertical axis, while the wider tabs 19** are shown along the horizontal axis. The two circumferential ridges 22 and 23 are disposed on two different radii close to the circumference of the support 18. The opening through which the actuating rod passes is located in the center of the support 18.

What is claimed is:

1. A slide valve with a partial vacuum actuator, especially for motor vehicle heating and/or air conditioning units, comprising:
   a valve housing having a bottom;
   a slide for opening and closing said valve;

a slide chamber for slidably containing the slide;

an actuating rod connected with the slide, and for actuating the slide;

a partial-vacuum actuator for actuating the actuating rod, and having a first housing section integral with the valve housing;

a flat seal for sealing the sliding chamber, and for surrounding and sealing the actuating rod;

a support for holding the flat seal against the bottom of the valve housing; and means for fastening and securing the support inside said first housing section, said means comprising a bayonet mount including a plurality of radial tabs on said support, a plurality of axial slots positioned along an inner cylindrical wall of the first housing section for slidably containing the tabs, and a plurality of circumferential slots merging into the axial slots, also for slidably containing the tabs.

2. A slide valve as recited in claim 1, further comprising:

a second housing section;

a diaphragm stretched between said first and second housing sections for defining a space for creating a partial vacuum, and connected to said actuating rod; and a return spring for biasing said actuating rod into a first position.

3. A slide valve as recited in claim 1, further comprising:

a first circumferential ridge having a first diameter, for engaging said flat seal and disposed on said support;

a second circumferential ridge having a second diameter, for engaging said flat seal and disposed on said bottom of the valve housing;

wherein said second diameter is different from said first diameter.

4. A slide valve as recited in claim 1, wherein said circumferential slots comprise helical sections.

5. A slide valve as recited in claim 1, wherein said tabs comprise a first pair of diametrically opposite tabs having a first width, and second pair of diametrically opposite tabs having a second width different from the first width; and wherein said axial slots comprise a first pair of slots having substantially said first width and for engaging said first tabs, and a second pair of slots having substantially said second width and for engaging said second tabs.

6. A slide valve as recited in claim 1, wherein said means for fastening and securing further comprises a detent mechanism including a first arrangement of ratchet teeth disposed between successive tabs on said support, a second ratchet member flexibly attached to the first housing section and for engaging the first arrangement.

7. A slide valve as recited in claim 6, wherein said second ratchet member comprises a spring tongue attached to said first housing section, and carrying two inwardly-directed ratchet teeth.

8. A slide valve as recited in claim 6, further comprising a second arrangement of ratchet teeth diametrically opposite to said first arrangement and offset by 180° plus half the width of a ratchet tooth.

* * * * *